United States Patent [19]
Lewis

[11] Patent Number: 6,056,015
[45] Date of Patent: May 2, 2000

[54] PROTECTING AND IDENTIFYING FITTINGS

[76] Inventor: Michael Joe Lewis, 2247 Belleview Dr., Oklahoma City, Okla. 73112

[21] Appl. No.: 09/196,872

[22] Filed: Nov. 20, 1998

[51] Int. Cl.[7] .................................................. F16L 55/10
[52] U.S. Cl. ...................... 138/89; 138/96 R; 138/96 T; 215/306
[58] Field of Search .................... 138/89, 96 R, 138/96 T; 215/230, 250, 251, 306; 220/256, 257, 258, 259, 375

[56] References Cited

U.S. PATENT DOCUMENTS

| | | | |
|---|---|---|---|
| 2,118,073 | 5/1938 | Dittmeyer | 138/96 R |
| 2,977,993 | 4/1961 | Scherer | 138/96 T |
| 5,004,016 | 4/1991 | Kliewer | 138/96 R |
| 5,623,971 | 4/1997 | Foernzler | 138/89 |
| 5,667,094 | 9/1997 | Rapchak et al. | 215/306 |
| 5,881,774 | 3/1999 | Utterberg | 138/96 R |
| 5,971,028 | 10/1999 | Kurimoto et al. | 138/96 T |
| 5,983,947 | 11/1999 | Utterberg | 138/96 R |

*Primary Examiner*—James Hook
*Attorney, Agent, or Firm*—Harold Levine, P.C.

[57] ABSTRACT

A versatile plastic cap assembly for plugging and/or protecting fittings comprising a joined pair of capping members, one of such capping members being adapted for snap fit onto a male fitting, and the other being adapted for snap fit onto a female fitting. The capping members are initially joined together with an easily breakable connector so as to retain them in pairs until put into use, at which time the two capping members may easily be separated as, for example by pulling or twisting. The invention also includes a method of retaining identification of and temporarily protecting ends of components adapted for connection or re-connection while the ends are disengaged.

24 Claims, 2 Drawing Sheets

PROTECTING AND IDENTIFYING FITTINGS

This invention relates to devices and methods for identifying and protecting fittings and more particularly to simplifying the temporary plugging/protection and/or identification of fittings adapted for interconnection of tubular members.

BACKGROUND OF THE INVENTION

Temporary protection for ends of tubes and the like has heretofore been proposed, illustrative of which are the disclosures of U.S. Pat. No. 2,580,762 granted to J. R. Grenier et al on Jan. 1, 1952 and U.S. Pat. No. 3,574,312 granted to Joseph T. Miller Apr. 13, 1971.

Other proposals have been made for protecting exposed ends of tubular members such as electrical cable, illustrative of which are the proposals of U.S. Pat. No. 3,847,183 which was granted to Vincent E. Meyer on Nov. 12, 1974.

Still other proposals have been made for temporary closing of tubular members to facilitate testing for piping system integrity. Illustrative of such are the proposals of U.S. Pat. No. 3,807,457 granted to Duane D. Logsdon on Apr. 30, 1974.

Although such proposals have addressed selected problems encountered in handling, installing and testing tubular members, there yet have remain unresolved drawbacks to their use. Thus, for example, among other problems, there have continued to be problems with protecting and marking mating ends of tubular connectors when such connectors are in their unconnected conditions. Accordingly, there has continued to be a need for inexpensively identifying and protecting such mating ends.

BRIEF SUMMARY OF THE INVENTION

The improved devices and methods according to the invention hereof include simple and cost effective features that ameliorate adverse conditions and characteristics heretofore associated with prior use and conditions. Thus, in accordance with the preferred embodiment hereof, inexpensive plastic caps are formed in pairs connected by small strips, or threads, that are easily broken apart by twisting or pulling after mounting. One cap of each pair is sized to fit over and protect male connector threads, while the remaining cap of each pair is sized to fit over and protect the corresponding female connector element. To facilitate size selection, standard size designations are preferably molded into each cap of each pair; and by the advantageous use of color coding, identification of mating caps is facilitated after the caps of a pair are separated. Color coding may also optionally be employed to identify size. Frictional fitting and retention is also facilitated by including in the caps for both female and male members, internal geometries and resilient characteristics of wall parts to provide resilient frictional fit; while in the cap for the male member there is additionally included a flexible protuberance adapted for cooperation with male threads. Installation and removal of the capping members is facilitated by inclusion of a flange, or lip, on each such member to facilitate non-slip grasping thereof and ready application of sufficient force to achieve installation and removal.

OBJECTS AND FEATURES OF THE INVENTION

It is one general object of the invention to improve protection of connector fittings.

It is another object of the invention to facilitate marking and identification of mating connector fittings.

It is yet another object of the invention to reduce cost and complexity of protecting and identifying connecting members.

It is yet another object of the invention to improve safety in use and to reduce likelihood of mis-connections.

Accordingly, in accordance with one feature of the invention, protective/identifying capping members are preferably molded of resilient plastic in pairs, thus enhancing cost effectiveness.

In accordance with another feature of the invention, flaired entry surfaces are provided for facilitating insertion and grasping of capped surfaces, thus facilitating positioning and use.

In accordance with yet another feature of the invention, internal flaired surfaces are included to facilitate expansion of cap internal geometries to accommodate oversize capped members, thus providing a range of sizes and size tolerances for each nominal cap size.

In accordance with another feature of the invention, the pairs of caps may be color coded, thus facilitating identification and reducing likelihood of mis-connection.

In accordance with yet another feature of the invention, the protective/identifying capping members of each pair may be marked as to size, thus facilitating selection and use.

In accordance with still another feature of the invention, the members of each pair are originally connected by a single central and axially disposed plastic connecting strip, or thread, thus facilitating simplicity of manufacture and use.

In accordance with yet a further feature of the invention, the plastic strip, or thread, is sized to be readily breakable by twisting, thus facilitating separation of pair members when desired.

In accordance with yet another feature of the invention, each of the aforementioned capping members is fitted with a readily graspable lip, or flange, thereby facilitating grasping and the application of force thereto.

These and other objects and features of the invention will be apparent from the following description, by way of example of a preferred embodiment, with reference to the drawing.

DESCRIPTION OF A PREFERRED EMBODIMENT

Figure 1:
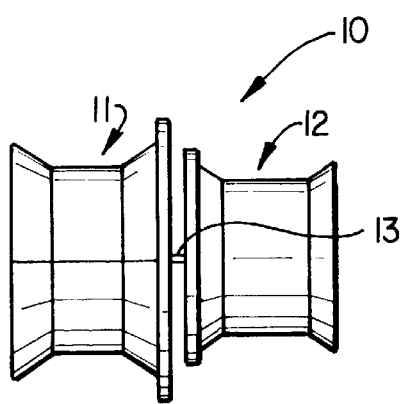
FIG. 1 is a side elevation view of a composite cap assembly of capping members (caps) illustrating their initial interconnection.

Now turning to the drawing, and more particularly FIG. 1 thereof, it will be seen to be a side elevation view of a composite pair 10 of caps 11 and 12 in accordance with the invention hereof and illustrating their initial interconnection by strip/thread 13. Caps 11 and 12, together with interconnecting strip/thread 13 preferably are of molded resilient plastic material such as polyethylene or polypropylene. Although such material may be of a different type, it should preferably be strong, impact resistant to prevent undesired shattering, resistant to deterioration due to sunlight exposure, and moderately resilient.

The two caps 11 and 12 preferably are marked with conventional arabic numerals to identify their sizes (e.g., which may be in inches, metric sizes, both inches and corresponding metric sizes, or types), and in addition they may be color coded. Color Coding (as hereinafter formally defined) is meant to include identification of mating pairs irrespective of size or use of different colors for selected sizes. In any event, the caps preferably exhibit colors which identify their original unity as part of a composite pair 10. Thus, the two caps of a pair may be of identical color to identify their original unity as part of a composite pair 10, or if desired they may be of different colors to signify different sizes; in the latter case, original identity as a pair being designated by marking with pair-identifying marks such as, for example, by notches. It should be understood that the foregoing description includes use of different colors for mating pairs of the same size, i.e., both caps of a pair being of the same color.

Figure 2:
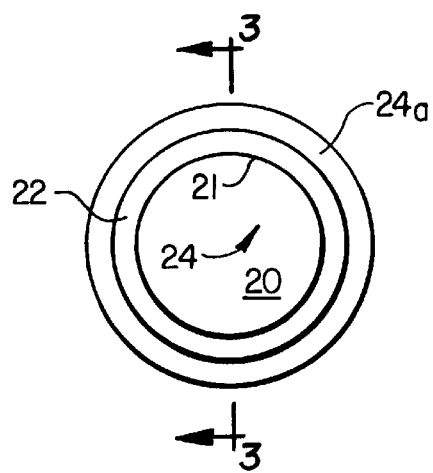
FIG. 2 is a left end view of the capping members of FIG. 1 as seen from the left side of FIG. 1.
Figure 4:
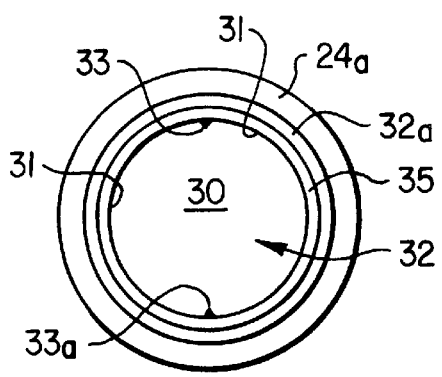
FIG. 4 is a right end view of the capping members of FIG. 1 as seen from the right side of FIG. 1.
Figure 3:
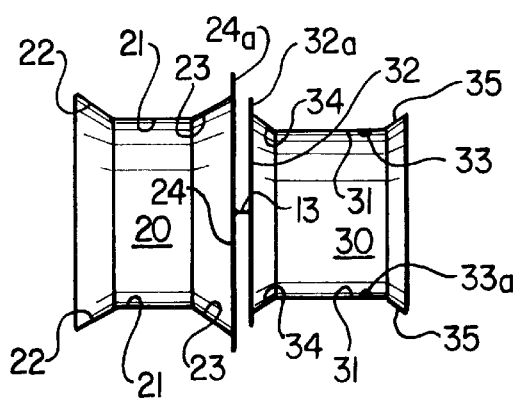
FIG. 3 is a sectional view taken along section lines 3—3 of FIG. 2.
Figure 5:
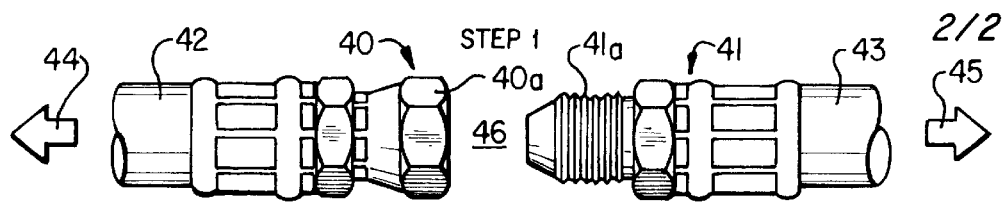
FIG. 5 is an exploded view depicting male and female fittings typically employed for joining tubing in their disconnected state.
Figure 6:
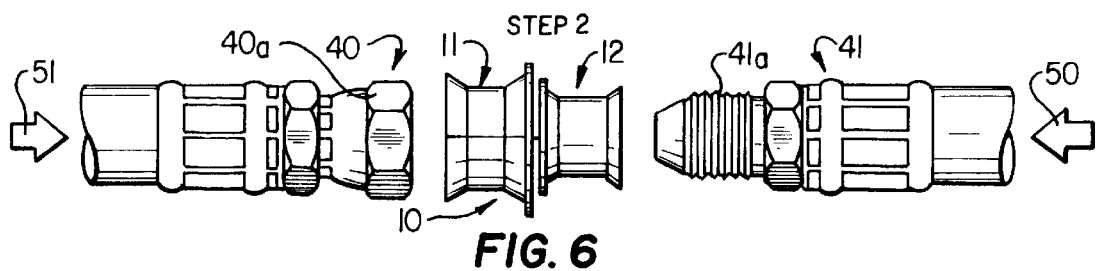
FIG. 6 is an exploded view similar to FIG. 5 but including a composite cap assembly according to FIG. 1.
Figure 7:
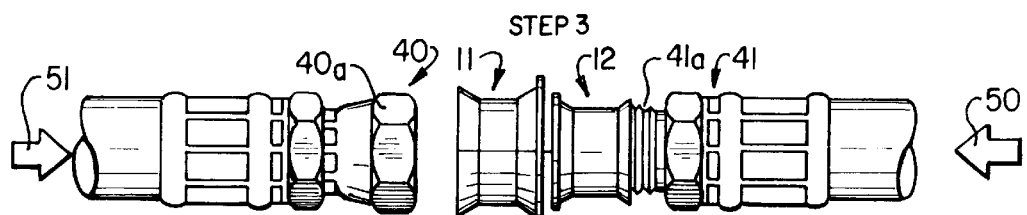
FIG. 7 is a view similar to that of FIG. 6 but depicting male threads of a connecting fitting inserted within the right hand capping member of FIG. 1.

As will be evident from the description of FIGS. 2–4, cap 11 is adapted for press (frictional) fitting over a conventional female hose connector such as connector 40 of FIGS. 5–7, and cap 12 is adapted to receive a press fitted corresponding male hose connector such as connector 41 (also FIGS. 5–7).

As previously mentioned, FIG. 2 is an end view showing cap 11 of FIG. 1 as seen from its left side. There, it will be observed are an essentially cylindrical recess 20 formed in part by inner surfaces of walls 21, 22, 23 and 24 (FIG. 3). As will be evident from FIG. 3, wall 24 is part of a flange, or lip, 24a that extends to the outer periphery of cap 11 as shown. Flange 24a (together with corresponding flange 32a are included to facilitate the grasping of caps 11 and 12 when mounting them to, or removing them from, the connectors with which they are to be employed as hereinafter described.

Figure 2A:
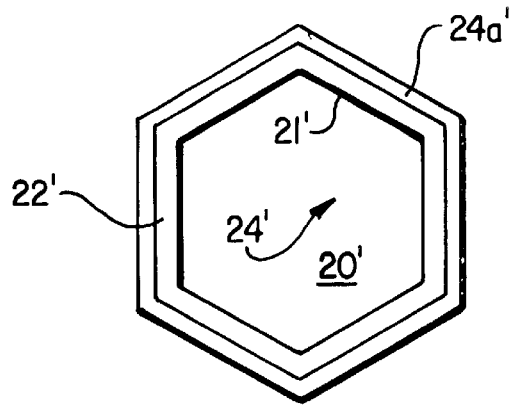
FIG. 2A is a left end view similar to that of FIG. 2 but depicting a hexagonal rather than circular geometry.

As mentioned above, FIG. 2A is a left end view similar to that of FIG. 2 but depicting a hexagonal rather than circular geometry. Identifying symbols are similar to those of FIG. 2 except for the superscripts. Thus, 20' of FIG. 2A corresponds to symbol 20 in FIG. 2; 21' to 21; 22' to 22; 24' to 24 and 24a to 24a.

As previously mentioned, FIG. 3 is a sectional view taken along section lines 3—3 of FIG. 2. There, it will be seen are recess 20, walls 21–24 and flange 24a. Walls 21, 22 and 23 are geometrically configured and comprised of resilient material so as to result in surface 21 being biased inwardly with respect to surfaces 22 and 23, thus facilitating frictional engagement by surface 21 with exterior surface 40a of FIGS. 5–7.

Definitions:

For purposes of this specification and claims, the following terms are defined as follows:

1. "Biased inwardly" means a configuration which results in pressure being exerted on an exterior surface of a member when such member is inserted into a recess, or cavity, such as that represented by recesses 20, 20' and 30 in the instant drawing figures.

2. "Discrete Protuberance" means a physical projection (e.g., projections 33 and 33a) extending from a support such as that represented by wall 31 of FIGS. 3 and 4 hereof.

3. "Color Coding" means different colors identifying capping pairs, or different sizes of items for which the capping pairs according to the invention are to be used.

Now returning to FIG. 3, elements of cap 12 are seen to be depicted in the right hand part thereof. Thus, there are seen recess 30 bounded by inner walls 31, 32, 34 and 35, wall 32 being an interior wall of a second flange portion 32a. Depending from interior wall 31 are protuberances 33 and 33a which may be separate (as shown) or a continuous circle, or segment thereof. Such protuberances are provided to engage male threads of conventional connector fittings such as those depicted at 41a in FIGS. 5–7 when a male connector (for which cap 12 is of appropriate size) is inserted into recess 30. As described above in connection with cap 12, walls 31, 34 and 35 are geometrically configured and comprised of resilient material so as to result in surface 31 being biased inwardly with respect to surfaces 34 and 35, thus facilitating frictional engagement by surface 31 with threads 41a of FIGS. 5–7.

As mentioned above, FIG. 4 is an end view of the capping assembly 10 of FIG. 1 as seen from the right side of FIG. 1. There are seen recess 30 formed by rear wall 32 and side walls 31, flaired sections 34 and 35, together with protuberances 33 and 33a. Also seen are parts of flanges 24a and 32a.

FIGS. 5–9 are included, in part, to illustrate steps in a preferred method of temporarily protecting and retaining identification of connecting (mating) ends 40 and 41 using the composite pair of caps, e.g., composite capping assembly 10. Turning more specifically to FIG. 5, it will be seen to be an exploded view depicting, in their disconnected state, a male fitting 41 and a corresponding female fitting 40 such as are typically employed for joining tubing or hoses. Although for illustrative purposes, hoses 42 and 43 are shown, it should be understood that the principles hereof may be applicable to other tubular members as well. Arrows 44 and 45 are included to represent movement apart of connector fittings 40 and 41 to provide a space 46 therebetween so as to permit emplacement of a composite pair of caps, e.g., composite capping assembly 10 as shown in FIG. 6.

Figure 8:
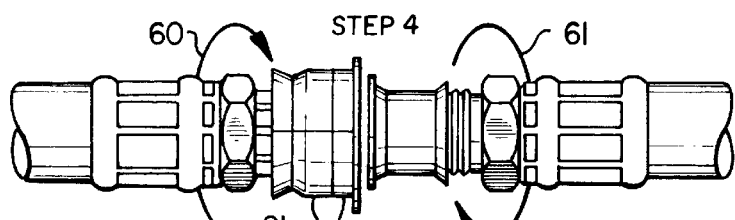
FIG. 8 is a view similar to that of FIG. 7 but depicting the female portion of the connecting fitting fitted within the left hand capping member of FIG. 1.
Figure 9:
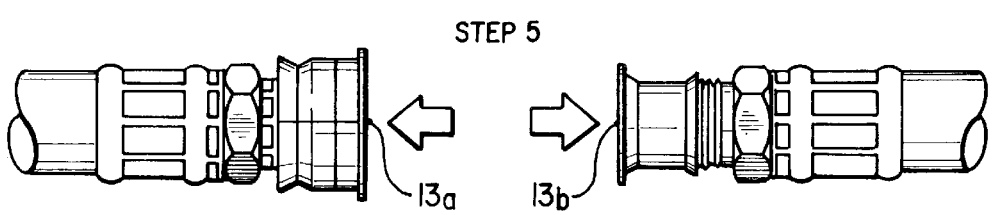
FIG. 9 depicts the members of FIGS. 6–8 after the right and left hand parts of the cap assembly of FIG. 1 have been separated.

As mentioned above, FIG. 6 is an exploded view similar to that of FIG. 5 but centrally including a composite cap assembly according to FIG. 1. Thus, the preferred method includes in addition to providing pairs of integrally-connected capping members adapted for frictional fitting over male and female mating parts of tubing connectors, inserting the threaded section 41a of male part 41 into cap 12 as shown in FIG. 7 and represented by inwardly pointing arrow 50. The method also includes inserting female fitting 40 into recess 20 (or 20') of cap 11 as represented by inwardly pointing arrow 51 and as shown in FIG. 8. Lastly, after connector fittings 40 and 41 have been pressed into their respective recesses 20 (or 20') and 30, (and as illustrated in FIGS. 8 and 9), caps 11 and 12 are separated as by twisting that is represented by oppositely directed circular arrows 60 and 61. Such twisting ruptures frangible thread/strip 13, thus separating caps 11 and 12 and exposing remaining thread/strip fragments 13a and 13b as shown.

Thus, there is disclosed a method of protecting and retaining identification of connecting ends of interconnecting members including steps of providing pairs of integrally-connected capping members adapted for frictional fitting over male and female mating parts of tubing connectors, each pair of capping members comprising a first section having a first recess geometrically configured to conform (when expanded) to external surface geometry of the female part, a second section having a second recess geometrically configured to conform to external surface geometry of the male part, and a frangible thread member connecting the first and second sections; inserting the female part into the first section; inserting the male part into the second section; and breaking the frangible thread member.

As optional additions to the foregoing methods (and as previously described) are steps of color coding the capping members according to pairs and/or size, as well as marking the capping members with indicia indicative of size and/or pairing.

As described in connection with FIGS. 2. 2A and 3, coextensive walls 21, 22 and 23, as well as corresponding coextensive walls 31, 34 and 35 are geometrically configured and comprised of resilient material so as to result in surfaces 21, 21' and 31 being biased inwardly with respect to surfaces 22–23, and 34–35 thus facilitating compressive or frictional engagement by surfaces 21 and 31 with corresponding exterior surfaces 40a and threads 41a of FIGS. 5–7 when connector 40 is forced into recess (cavity) 20 or 20 and threads 41a are forced into cavity 30. Thus, as is evident from reference to FIGS. 6 and 7, the exterior of female connector 40 is larger than the throat part (bounded by wall 21 or 21') of recess 20 or 20'; and the exterior diameter of threads 41a is greater than the throat part 31 of recess 30.

The aforementioned inward bias is occasioned by the sloping surfaces 23 and 34, respectively, which preferably slope at an angle of about forty-five degrees (as shown). In addition, the slopes of surfaces 22 (or 22') and 35 facilitate insertion into recess cavities 20, 20' and 30 of the above-described female connector member 40 and male connector member 41.

The importance of resiliency or deformability of caps 11 and 12 is evident from referring to FIG. 8 wherein it is seen that the geometry of sections 21a and 23a have been extended outwardly by the expansive force imparted thereto when surface 40a of female connector part 40 is urged inwardly into recess 20 or 20'. As will be evident from the drawing, the slope of surface 23 has lessened substantially as a consequence of the thrust imparted to surface 21 (or 21') by female connector surface 40a.

It will now be evident that there has herein been described an improved composite capping assembly comprising pairs of capping members adapted for temporarily capping mating connecting elements. There also has been described herein improved methods for protecting and retaining identification of connecting ends of interconnecting members.

Although the inventions hereof have been described by way of preferred embodiments, it will be evident that adaptations and modifications may be employed without departing from the spirit and scope thereof.

The terms and expressions employed herein have been used as terms of description and not of limitation; and thus, there is no intent of excluding equivalents, but on the contrary it is intended to cover any and all equivalents that may be employed without departing from the spirit and scope of the inventions.

What is claimed is:

1. A protective capping member adapted for protecting and identifying male and female mating parts of a tubing connector comprising:
   (a) a first section having a first recess geometrically configured to external surface geometry of said female part,
   (b) a second section having a second recess geometrically configured to external surface geometry of said male part, and
   (c) a frangible thread member connecting said first and said second sections.

2. A protective capping member according to claim 1 wherein said thread member is homogeneous with said first and said second sections.

3. A protective capping member according to claim 1 wherein said first section includes a resilient surface normally biased inwardly to frictionally engage said external surface geometry of said female part.

4. A protective capping member according to claim 3 wherein said first recess includes a central axis and wherein a part of said first recess is bounded by walls displaced from said central axis and substantially parallel to said central axis.

5. A protective capping member according to claim 4 wherein said recess includes an opening for inserting said female part.

6. A protective capping member according to claim 5 wherein said resilient surface is displaced from said central axis a first predetermined distance, and wherein a part of said walls adjacent said opening is separated from said central axis by a second distance greater than said first predetermined distance.

7. A protective capping member according to claim 6 wherein said recess terminates at an end opposite from said opening and wherein another part of said walls adjacent said end is separated from said central axis by a third distance greater than said first predetermined distance.

8. A protective capping member according to claim 7 wherein said second and said third distances are substantially equal.

9. A protective capping member according to claim 8 further including a flange member depending from said another part of said walls, said flange member comprising said end of said first section.

10. A protective capping member according to claim 1 wherein said second section includes second recess walls and a discrete protuberance projecting inwardly within said second recess to frictionally engage said external surface geometry of said male part.

11. A protective capping member according to claim 10 wherein said second recess includes a second recess central axis, wherein a part of said second recess is bounded by said second recess walls, and wherein a part of said second recess walls are displaced from said second recess central axis by a fourth distance and substantially parallel to said second recess central axis.

12. A protective capping member according to claim 11 wherein said second recess includes a second recess opening for inserting said male part.

13. A protective capping member according to claim 12 wherein said second recess terminates at a second recess end opposite from said second recess opening.

14. A protective capping member according to claim 12 wherein said second recess walls include a second resilient surface normally biased inwardly to frictionally engage said external surface geometry of said male part.

15. A protective capping member according to claim 14 wherein said second recess terminates at a second recess end opposite from said second recess opening and wherein another part of said second recess walls adjacent said second recess end is separated from said central axis by a fifth distance greater than said fourth distance.

16. A protective capping member according to claim 15 wherein another part of said second recess walls adjacent said second recess opening is displaced from said second recess central axis by a sixth distance greater than said fourth distance.

17. A protective capping member according to claim 16 further including a second flange member depending from said second recess walls, said flange member comprising an end of said second section.

18. A protective capping member adapted for protecting and identifying male and female mating parts of a tubing connector comprising:
   (a) a first section having a first recess geometrically configured to substantially conform to external surface geometry of said female part; said first section
      (i) including a resilient surface normally biased inwardly to frictionally engage said external surface geometry of said female part;
      (ii) having a central axis and wherein a part of said first recess is bounded by walls displaced from said central axis and substantially parallel to said central axis;
      (iii) having an opening to said recess for inserting said female part;
      (iv) said resilient surface displaced from said central axis a first predetermined distance, and wherein a part of said walls adjacent said opening is separated from said central axis by a second distance greater than said first predetermined distance; wherein said recess terminates at an end opposite from said opening and wherein another part of said walls adjacent said end is separated from said central axis by a third distance greater than said first predetermined distance, said second and said third distances being substantially equal;
      (v) a flange member depending from said another part of said walls, said flange member comprising said end of said first section;
   (b) a second section having a second recess geometrically configured to substantially conform to external surface geometry of said male part; said second section
      (i) including second recess walls and a discrete protuberance projecting inwardly within said second recess to frictionally engage said external surface geometry of said male part;
      (ii) including a second recess central axis, wherein a part of said second recess is bounded by walls displaced from said second recess central axis and substantially parallel to said second recess central axis;
      (iii) including within said second recess a second recess opening for inserting said male part;
      (iv) including second recess walls displaced from said second recess central axis a fourth predetermined distance;
      (iv) including a flange terminating said second recess at an end opposite from said second recess opening; and
   (c) a frangible thread member connecting said first and said second sections, said thread member being homogeneous with said first and said second sections.

19. A method of protecting and retaining identification of connecting ends of interconnecting members including steps of:
   a) providing pairs of integrally-connected capping members adapted for frictionally fitting over male and female mating parts of tubing connectors, each pair of said members comprising a first section having a first recess geometrically configured to conform to external surface geometry of said female part, a second section having a second recess geometrically configured to conform to external surface geometry of said male part, and a frangible thread member connecting said first and said second sections;
   b) inserting said female part into said first section;
   c) inserting said male part into said second section; and
   d) breaking said frangible thread member.

20. The method of claim 19 wherein said breaking said frangible thread member includes twisting said thread member.

21. The method of claim 19 further including a step of color coding both capping members of a pair with identical color.

22. The method of claim 19 further including a step of color coding said capping members according to size.

23. The method of claim 19 further including a step of marking said capping members with numbers indicative of size.

24. The method of claim 19 further including a step of imparting to both capping members of a pair physical indicia for identifying both said capping members of a pair as part of the same pair.

* * * * *